No. 12,129. REISSUED JUNE 30, 1903.

P. M. PIERSON.

SASH BAR FOR GREENHOUSES, &c.

APPLICATION FILED MAY 18, 1903.

Witnesses:
J. Stair
Chas. H. Smith

Inventor:
Paul M. Pierson
per Harold Serrell atty.

No. 12,129. Reissued June 30, 1903.

UNITED STATES PATENT OFFICE.

PAUL M. PIERSON, OF OSSINING, NEW YORK, ASSIGNOR TO THE PIERSON-SEFTON COMPANY, A CORPORATION OF NEW JERSEY.

SASH-BAR FOR GREENHOUSES, &c.

SPECIFICATION forming part of Reissued Letters Patent No. 12,129, dated June 30, 1903.

Original No. 697,746, dated April 15, 1902. Application for reissue filed May 18, 1903. Serial No. 157,624.

*To all whom it may concern:*

Be it known that I, PAUL M. PIERSON, a citizen of the United States, residing at Ossining, (heretofore erroneously stated as residing at Scarboro, New York,) in the county of Westchester and State of New York, have invented an Improvement in Sash-Bars for Greenhouses or other Glazed Structures, of which the following is a specification.

My invention relates to a novel construction of sash-bars for greenhouses. Heretofore it has been usual to make these sash-bars of long and relatively deep strips of wood with oppositely-grooved edges, the edges receiving the putty and the glass and the bars in turn being supported upon beams at right angles thereto and also upon supporting-posts. A wooden bar has also been made and been supported upon an edgewise plate of metal let into the bar; but these various structures were of considerable dimensions and cast shadows in the greenhouse, so that more or less of the sunlight was cut off from the plants. Furthermore, with a wooden structure the parts are not only of large size for strength, but they rot out from the moisture and make constant repairs necessary.

The object of my invention is to overcome these objections, to produce a bar of increased strength, durability, and lightness, and a bar in which the shadow-line is reduced to a negligible extent.

In my improvement I employ a bar of wood and metal, the metal furnishing the strength and being the main portion exposed inside the greenhouse and the wood fitting the metal part and coming between the glass and being the main portion exposed outside to the weather. As the wood being a non-conductor is not susceptible to change with heat and cold and as the metal is not easily affected by moisture, the arrangement employed by me possesses a maximum of efficiency and a minimum of space occupied.

I prefer in carrying out my invention to employ a U-shaped bar of metal and to fit the wooden bar therein and to make therewith a projecting rib which occupies a place between the edges of the lines of glass. I may also employ moisture-troughs arranged in connection with the metal bar and may employ a metal molding secured to the wooden bar upon the outside, all of which features are hereinafter more particularly set forth.

Figure 1:
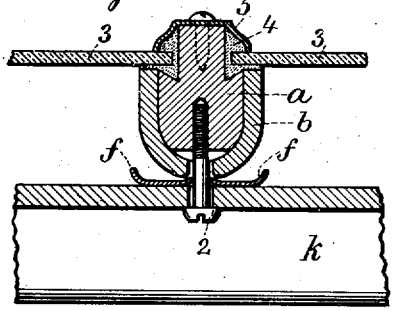
Figure 2:
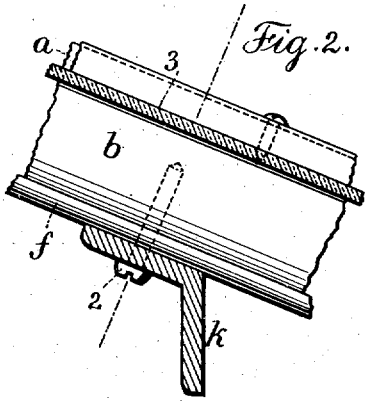

In the drawings, Figure 1 is a cross-section, and Fig. 2 a longitudinal section, representing the most approved form of my sash-bar. Figs. 3, 4, 5, and 6 are cross-sections of forms of my invention.

With special reference to Figs. 1 and 2, *a* represents the wooden bar, *b* the U-shaped metal bar receiving the larger part of the wooden bar. A projecting rib rises from the bar *a* and is central therewith. At the sides of this rib are grooves to receive the putty 4, and the edges of the U-shaped bar *b* are approximately on a line with the parts of the wooden bar at these grooves. The glass 3 lies upon the putty, and a close joint is made thereby as between the edges of the glass and the projecting rib of the wood bar *a* and as between the under surfaces of the glass 3 and the edge of the U-shaped metal bar *b*. I may employ a molding or plate 5, of sheet metal, over and longitudinal with the projecting rib of the bar *a* and secured thereto by screws or nails. The edges of this plate extend down to and preferably bear upon the outer surfaces of the glasses 3, and the spaces within the plate 5 are advantageously filled with putty. *k* represents an angle-iron purlin, one of a number placed transversely of the sash-bar, there being screws 2 preferably passing through the purlin and through openings in the base of the metal bar *b* up into the wooden bar *a* or other equivalent connecting devices, by which the parts are securely connected together. In these figures *f* represents a moisture-trough beneath the metal bar *b* and above the purlin *k*, the edges thereof being upturned and perforations made therein for the screws 2. These perforations are preferably punched in the sheet of metal forming the moisture-trough *f*. In punching the holes in the moisture-trough *f* for the screws 2 a raised portion or neck is usually produced around the screw-opening, and I prefer to make the holes in the metal bar *b* sufficiently larger than the screws 2 to receive these neck portions of the moisture-trough. The function performed by these neck portions is to throw off the water from the screws 2 to prevent the lower ends and heads of the screws being rusted where they pass through the purlin, and the openings in the metal bar *b* provide for the exit of any moisture or water that may possibly get in between the wooden and metal bars. The wooden bar *a* does not entirely fill the metal bar *b*, so that an appreciable internal chamber to receive any collected moisture finding its way between the wood and metal parts is formed within and at the base of the metal bar. Should any moisture so collect, it will readily escape into the moisture-trough *f* through the openings in the metal bar *b*.

Figure 3:
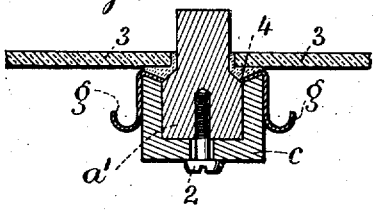
Figure 4:
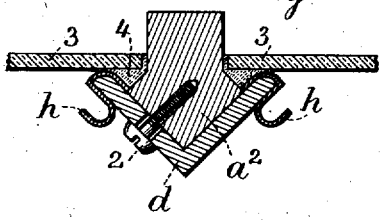
Figure 5:
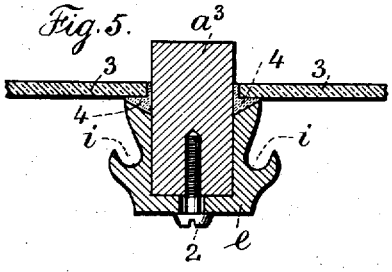

The structures shown in Figs. 3, 4, and 5 are to all intents and purposes the equivalents of the structure shown in Figs. 1 and 2, in all cases the metal bar inclosing the wooden bar beneath the glass and leaving part of the wooden bar between the glass and exposed above the same. In the structure shown in Fig. 3 the metal bar *c* is of U form with angular corners, and the wooden bar $a'$ is received therein and the parts are connected by the screws 2. The upper edges of the metal bar are inwardly tapered and the moisture-troughs *g* are hung over these edges, and the edges of the wooden bar adjacent to the upper edges of the metal bar are also tapered to provide recesses to receive the putty.

In the structure shown in Fig. 4 the metal bar *d* is of angular construction. The wooden bar $a^2$ fits the same and the metal bar *d* comes up to the under surfaces of the glass. The parts are connected by screws 2 and the moisture-troughs *h* are hung over the upper edges of the metal bar in a manner similar to that shown in Fig. 3, and recesses are provided for the putty which are similar to the recesses in Fig. 3.

In Fig. 5 the wooden bar $a^3$ is of rectangular form in cross-section and is received by the U form of metal bar *e*. The upper edges of the metal bar are inwardly tapered to provide recesses at the junction of their surfaces and the vertical edges of the wooden bar for the reception of the putty upon which the glasses 3 are laid. Screws 2 are also provided in this form of the invention for connecting the metal and wooden bars. In this metal bar *e*, Fig. 5, the moisture-troughs *i* are made integral or of the same material as the bar by rolling channels in the opposite edges of the bar.

Figure 6:
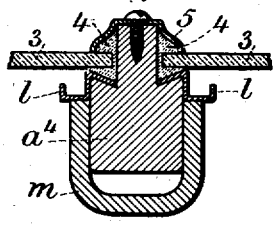

In the form of invention, Fig. 6, over and above the form shown in Fig. 1 the wooden bar $a^4$ has been deepened and the metal bar *m* of U form moved sufficiently away from the glasses 3 to provide moisture-troughs *l* of peculiar form near the glasses, hanging upon the upper edges of the bar $a^4$ below the putty and conforming to the surface of the bar $a^4$ above the bar *m* and to the edges of the bar *m*, the free edges of which are turned up beyond the bar *m*.

I do not herein limit myself to the special cross-sectional form of the wooden bar or of the metal bar, nor to the form or inclination of the putty-receiving recesses, nor to the employment of a molding or strip of metal over the rib of the wooden bar *a*, nor to the special form or use of the moisture-throughs, neither do I limit myself to the location or use of the connecting-screws, as other equivalent fastening devices may be employed.

I claim as my invention—

1. A sash-bar for greenhouses and other glazed structures, comprising a metal bar of substantially U shape in cross-section, a wooden bar the larger part of which is received within the channel of the metal bar, a portion of the wooden bar extending between the glasses and projecting beyond the same and receiving the devices securing the glasses, there being shoulders at either side of the projecting portion of the wooden bar to receive the putty upon which the glasses rest and fastening devices for connecting the metal and wooden bars.

2. A sash-bar for greenhouses and other glazed structures, comprising a wooden bar having a portion of reduced width forming a rib with a shoulder at either side, a metal bar receiving the main portion of the wooden bar, and the rib portion of the wooden bar being between the glasses and projecting beyond the same, and fastening devices passing through the metal bar into the wooden bar for connecting the parts.

3. A sash-bar for greenhouses and other glazed structures, comprising a wooden bar having a portion of reduced width forming a rib with a shoulder at either side, a metal bar receiving the main portion of the wooden bar and the rib portion of the wooden bar being between the glasses and projecting beyond the same and fastening devices passing through the metal bar into the wooden bar for connecting the parts, and devices for collecting and conveying away moisture connected to and supported by the metal bar.

4. A sash-bar for greenhouses, comprising a wooden bar having a rising projecting longitudinal rib, a U-shaped metal bar surrounding the larger portion of the wooden bar and adapted at its free edges to come up to the under surface of the glass and completely inclose the part of the wooden bar beneath the glass, the rib of the wooden bar coming between the glasses and projecting above the same, there being recesses upon the opposite sides of the projecting rib to receive putty into which the glasses are set, and fastening devices passing through openings in the U-shaped metal bar into the wooden bar for connecting the parts, substantially as set forth.

5. A sash-bar for greenhouses comprising a wooden bar having a rising projecting longitudinal rib, a U-shaped metal bar surrounding the larger portion of the wooden bar and adapted at its free edges to come up to the under surface of the glass and completely inclose the part of the wooden bar beneath the glass, the rib of the wooden bar coming between the glasses and projecting above the same, there being recesses upon the opposite sides of the projecting rib to receive putty into which the glasses are set, and screws passing through openings in the U-shaped metal bar into the wooden bar for connecting the parts, and devices for collecting and conveying away moisture, substantially as set forth.

6. A sash-bar for greenhouses comprising a wooden bar having a rising projecting longitudinal rib, a U-shaped metal bar surrounding the larger portion of the wooden bar and adapted at its free edges to come up to the under surface of the glass and completely inclose the part of the wooden bar beneath the glass, the rib of the wooden bar coming between the glasses and projecting above the same, there being grooves upon the opposite sides of the projecting rib to receive putty into which the glasses are set, screws passing through openings in the lower portion of the U-shaped metal bar into the wooden bar for connecting the parts, a moisture-trough below the U-shaped metal bar with upturned edges and located parallel with the metal bar and held thereto by the same screws that connect the metal and the wooden bars, the openings in the metal bar being of larger area than the screws passing therethrough, and the openings for the screws in the moisture-trough being provided with a neck for deflecting the moisture from the screws, and the said neck being received in the openings in the metal bar, substantially as set forth.

7. A sash-bar for greenhouses and other glazed structures, comprising a wooden bar, a metal bar receiving a part of the wooden bar, and a part of the wooden bar being between the glasses, and projecting beyond the same, and fastening devices for connecting the metal and wooden bars, there being openings through the lower portion of the metal bar, and the wooden bar not entirely filling the metal bar, so that an appreciable internal chamber is formed between the same and the base of the metal bar to receive any collected moisture passing between the said bars, substantially as set forth.

8. A sash-bar for greenhouses and other glazed structures, comprising a wooden bar having a portion of reduced width forming a rib with a shoulder at either side, a metal bar receiving the main portion of the wooden bar and the rib portion of the wooden bar being between the glasses and projecting beyond the same, and fastening devices passing through the metal bar into the wooden bar for connecting the parts, moisture-troughs connected to the said parts for receiving the condensation from the under side of the glasses, and water that may leak through the structure and a plate of metal over and longitudinal with the projecting portion of the wooden bar and secured thereto with the edges of the plate extending down to and preferably bearing upon the outer surfaces of the glasses, substantially as set forth.

9. A sash-bar for greenhouses and other glazed structures, comprising a wooden bar having a portion of reduced width forming a rib with a shoulder at either side, a metal bar receiving the main portion of the wooden bar and the rib portion of the wooden bar being between the glasses and projecting beyond the same, fastening devices passing through the metal bar into the wooden bar for connecting the parts, and a plate of metal over and longitudinal with the projecting portion of the wooden bar and secured thereto with the edges of the plate extending down to and preferably bearing upon the outer surface of the glasses, substantially as set forth.

10. A sash-bar for greenhouses, comprising a wooden bar having a rising projecting longitudinal rib, a metal bar surrounding the larger portion of the wooden bar and adapted at its free edges to come up to the under surface of the glass and completely inclose the part of the wooden bar beneath the glass, the rib of the wooden bar coming between the glasses and projecting above the same, and moisture-troughs connected to the said parts for receiving the condensation from the under side of the glasses and water that may leak through the structure, substantially as set forth.

PAUL M. PIERSON.

Witnesses:
GEO. T. PINCKNEY,
BERTHA M. ALLEN.